(12) United States Patent
Kume et al.

(10) Patent No.: US 8,647,226 B2
(45) Date of Patent: Feb. 11, 2014

(54) ROTARY ACTUATOR

(75) Inventors: Mikine Kume, Chiryu (JP); Shigeru Yoshiyama, Kariya (JP); Seiji Nakayama, Obu (JP)

(73) Assignee: Denso Corporation, Kariya (JP)

( * ) Notice: Subject to any disclaimer, the term of this patent is extended or adjusted under 35 U.S.C. 154(b) by 352 days.

(21) Appl. No.: 13/094,122

(22) Filed: Apr. 26, 2011

(65) Prior Publication Data

US 2011/0263373 A1    Oct. 27, 2011

(30) Foreign Application Priority Data

Apr. 27, 2010  (JP) ................................. 2010-101677

(51) Int. Cl.
  *F16H 3/70*  (2006.01)
  *F16H 1/32*  (2006.01)
(52) U.S. Cl.
  USPC .......................................... 475/170; 475/162
(58) Field of Classification Search
  USPC ........................................................ 475/170
  See application file for complete search history.

(56) References Cited

U.S. PATENT DOCUMENTS

| | | | | |
|---|---|---|---|---|
| 3,037,400 A | * | 6/1962 | Sundt | 475/180 |
| 4,994,005 A | * | 2/1991 | Rennerfelt | 475/162 |
| 5,232,412 A | * | 8/1993 | Zheng et al. | 475/162 |
| 7,847,447 B2 | * | 12/2010 | Kume et al. | 310/83 |
| 2009/0189468 A1 | | 7/2009 | Kume et al. | |

FOREIGN PATENT DOCUMENTS

| EP | 0391714 A1 | 7/1999 |
|---|---|---|
| JP | 11-263234 | 9/1999 |
| JP | 2002-115748 | 4/2002 |
| JP | 2010-151197 | 7/2010 |

OTHER PUBLICATIONS

Office Action (2 pgs.) dated Apr. 26, 2012 issued in corresponding Japanese Application No. 2010-101677.

* cited by examiner

*Primary Examiner* — David D Le
*Assistant Examiner* — Colby M Hansen
(74) *Attorney, Agent, or Firm* — Nixon & Vanderhye, P.C.

(57) ABSTRACT

A sun gear is supported by an eccentric portion of a rotor via a bearing and rotatable eccentrically to the rotor axis. A ring gear includes inner teeth via which the ring gear is meshed with outer teeth of the sun gear. An output shaft is located adjacent to the sun gear in the axial direction. A fitted portion of the output shaft is loosely fitted to a fitting portion of the sun gear to transfer rotation of the sun gear to the output shaft. The bearing has a center position located in a fitting overlap region between the fitting portion of the sun gear and the fitted portion of the output shaft in the axial direction and/or located in a gear overlap region between the outer teeth of the sun gear and the inner teeth of the ring gear which are meshed with the outer gear.

5 Claims, 4 Drawing Sheets

ROTARY ACTUATOR

CROSS REFERENCE TO RELATED APPLICATION

This application is based on and claims priority to Japanese Patent Application No. 2010-101677 filed on Apr. 27, 2010, the contents of which are incorporated in their entirely herein by reference.

TECHNICAL FIELD

Example embodiments of the present invention relate to a rotary actuator including a reduction gear combined with an electric motor.

BACKGROUND

A known shift-by-wire system includes a rotary actuator as a driving device for switching a shift range of an automatic transmission device. For example, JP-A-2009-177982 discloses a rotary actuator including an electric motor and a reduction gear. In the configuration disclosed by JP-A-2009-177982, the electric motor and the reduction gear are arranged to be adjacent to each other in the axial direction to reduce the total thickness of the rotary actuator and to enhance output torque of the rotary actuator.

The reduction gear of the rotary actuator includes an eccentric portion, which is eccentric relative to an output shaft. The eccentric portion supports a sun gear. The sun gear includes outer teeth at that outer circumferential periphery. The outer teeth of the sun gear meshes with a ring gear. The sun gear is configured to perform a rotary motion centering on the eccentric portion simultaneously with an orbital motion along the inner gear of the ring gear. The sun gear includes a projected portion projected from the sun gear. The output shaft includes a flange portion having a fitting hole. The projected portion of the sun gear is loosely fitted to the fitting hole of the output shaft thereby to enable transmission of rotation of the sun gear to the output shaft.

The eccentric portion rotatably supports the sun gear via a bearing. The sun gear is applied with a moment of force in a direction different from the rotative direction due to engagement with the ring gear and coupling with the output shaft via the projected portion. As a result, the bearing may not sufficiently reduce inclination of the sun gear, and consequently, the gear efficiency of the rotary actuator may be decreased. Recently, it is desirable to reduce the size and weight of a rotary actuator. In addition, it is also desirable to enhance the gear efficiency of a rotary actuator.

SUMMARY

Example embodiments of the present invention address the above disadvantage. According to one aspect, a rotary actuator comprises a tubular stator. The rotary actuator further comprises a rotor located on a radially inside of the stator, the rotor including a rotor axis having an eccentric portion, and the eccentric portion having an eccentric axis eccentric relative to a center axis of the rotor. The rotary actuator further comprises a disc-shaped sun gear supported by the eccentric portion via a bearing and eccentrically rotatable relative to the center axis, the sun gear including outer teeth at an outer circumferential periphery, the sun gear further including a fitting portion for transmitting rotation in an axial direction. The rotary actuator further comprises an annular ring gear located on a radially outside of the sun gear, the ring gear including inner teeth at an inner circumferential periphery, the inner teeth of the ring gear being meshed with the outer teeth of the sun gear. The rotary actuator further comprises an output shaft adjacent to the sun gear in the axial direction, the output shaft including a fitted portion loosely fitted to the fitting portion of the sun gear to be in contact with the fitting portion in a rotative direction to transfer rotation of the sun gear to the output shaft. The bearing of the sun gear has a center position in the axial direction. The center position of the bearing is located in a fitting overlap region between the fitting portion of the sun gear and the fitted portion of the output shaft in the axial direction.

BRIEF DESCRIPTION OF THE DRAWINGS

The above and other objects, features and advantages will become more apparent from the following detailed description made with reference to the accompanying drawings. In the drawings.

DETAILED DESCRIPTION

Example embodiments of the present embodiment relate to a rotary actuator configured to function as a drive unit of a shift-by-wire system for manipulating a shift range of an automatic transmission device. As follows, the configuration of the rotary actuator will be described with reference to FIGS. 1 to 3. In FIG. 2, hatching of the components is omitted.

Figure 1:
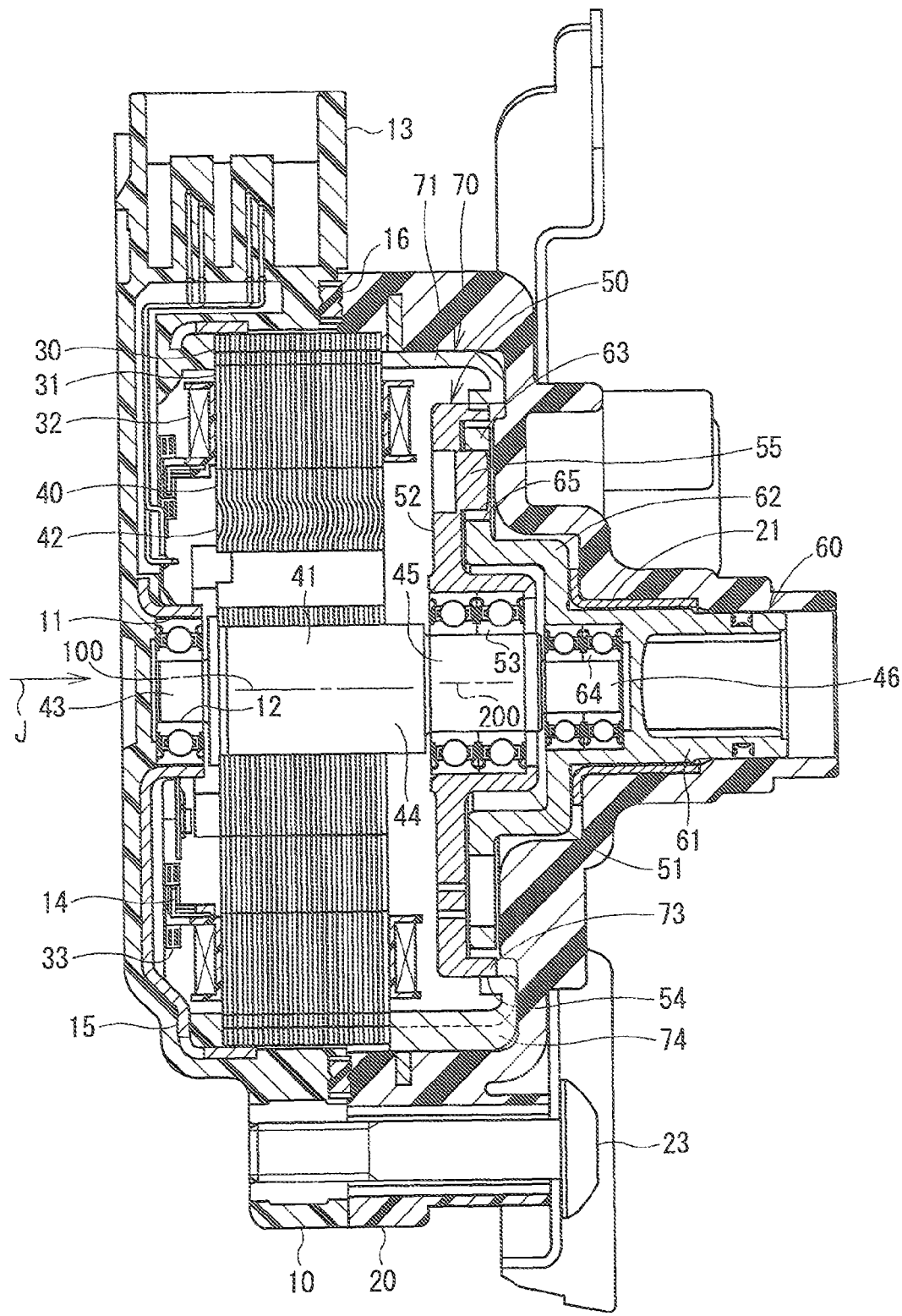
FIG. 1 is a sectional view showing a rotary actuator according to one embodiment.
Figure 2:
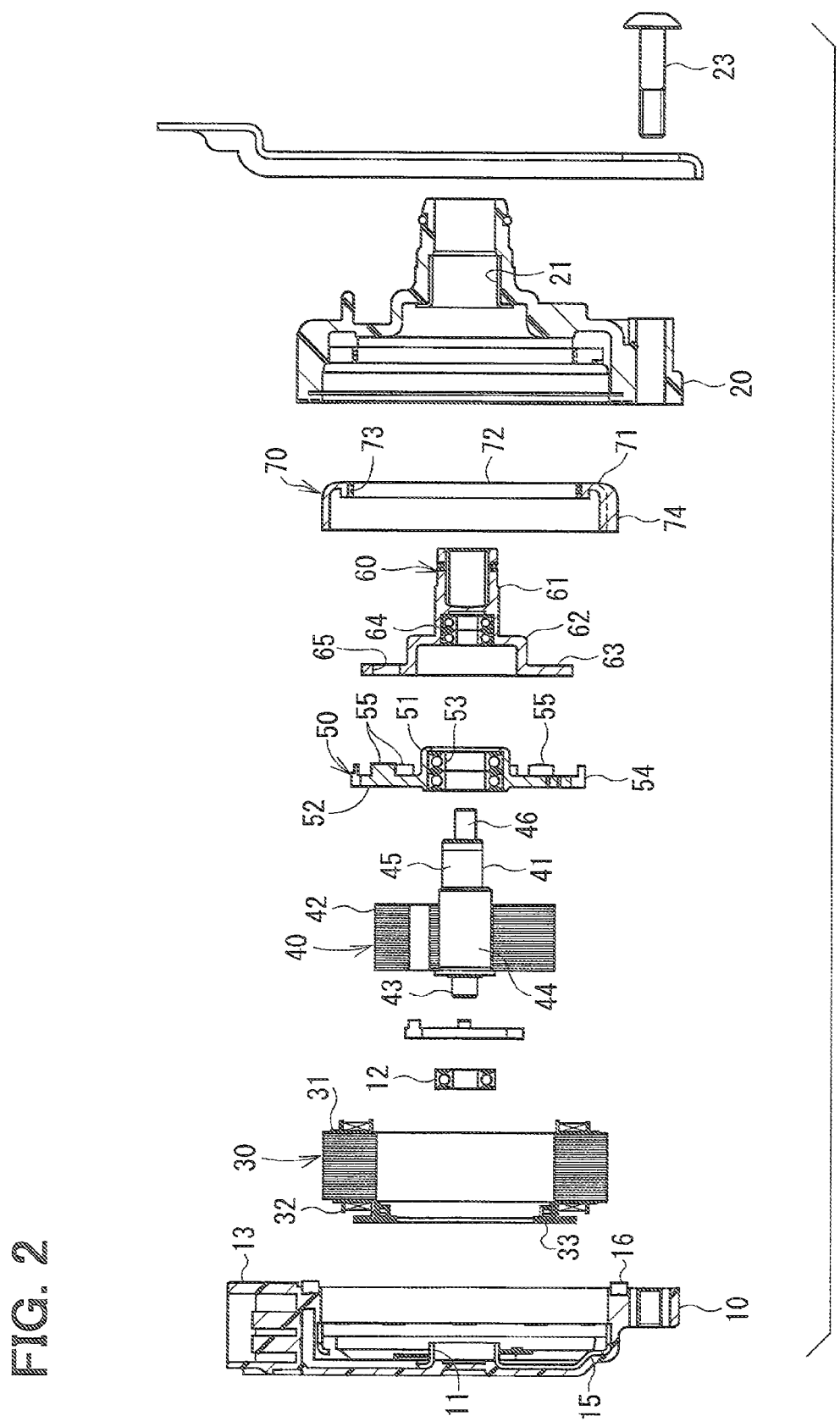
FIG. 2 is an exploded view showing the rotary actuator according to the one embodiment.

The rotary actuator includes a switched reluctance motor (SR motor) and a reduction gear arranged in the axial direction represented by the arrow J in FIG. 1. The rotary actuator further includes a housing functioning as an outer shell accommodating the SR motor and the reduction gear. The housing is a formed of, for example, resin. The housing includes a rear housing 10 and a front housing 20. The rear housing 10 surrounds the side of the SR motor. The front housing 20 surrounds the side of the reduction gear.

The rear housing 10 is in a deep-dish shape and is formed with an opening 11 at the center of its bottom portion. A rear bearing 12 is located in the opening 11. The rear housing 10 is formed with a connector portion 13 including a terminal 14 at the bottom portion. The terminal 14 is configured to receive electricity supplied from an external device such as an electronic control unit (ECU) connected to the connector portion 13. The terminal 14 is insert-molded with a metallic plate 15.

The front housing 20 is in a cylindrical shape matched with the shape of the reduction gear. The front housing 20 opens on the side of the rear housing 10. The front housing 20 reduces in diameter stepwise in the direction to be away from the rear housing 10. The front housing 20 accommodates the reduction gear and a part of the SR motor. The inner circumferential periphery of a tip end of the front housing 20 is equipped with a tubular metal bearing 21 for rotatably supporting the reduction gear.

The rear housing 10 is secured to the front housing 20 by a bolt 23 or another fastener. The housings 10, 20 are connected with each other via an annular resilient member 16 therebetween to accommodate the SR motor and the reduction gear.

The SR motor is a brushless motor including a stator 30 and a rotor 40 and is configured to generate driving force. The stator 30 is substantially in a cylindrical shape and includes a stator core 31 and a coil 32. The stator 30 is press-fitted to a plate 15 of the rear housing 10 and thereby secured to the rear housing 10.

The stator core 31 is formed of multiple thin plates stacked in the thickness direction. The stator core 31 includes stator teeth arranged at a predetermined angular interval such as 30 degrees and protruded radially inward from the stator core 31. The coil 32 is wound around each of the stator teeth.

A bus bar 33 is equipped to a portion of the coil 32 on the side of the rear housing 10. The bus bar 33 is electrically coupled to the terminal 14 equipped to the rear housing 10. In the present electric configuration, the coil 32 is supplied with electricity from an external device though the terminal 14 according to a driving signal caused by a controller such as the ECU.

The rotor 40 is located radially inside of the stator 30. The rotor 40 includes a rotor axis 41 and a rotor core 42. The rotor axis 41 includes a base end 43, a press-fitted portion 44, an eccentric portion 45, and a tip end 46 arranged from the side of the rear housing 10 in order.

The base end 43 and the tip end 46 are axes smaller in diameter relative to other portions of the rotor axis 41. The rotor core 42 is press-fitted into the press-fitted portion 44. The base end 43, the press-fitted portion 44, and the tip end 46 are coaxial with each other. The eccentric portion 45 is eccentric to a portion of the rotor axis 41 other than the eccentric portion 45. Specifically, a center axis (eccentric axis) 200 of the eccentric portion 45 is eccentric to a center axis 100 of the rotor axis 41.

As described above, the rotor core 42 is formed of multiple thin plates stacked in the thickness direction. The press-fitted portion 44 of the rotor axis 41 is press-fitted to the rotor core 42. The rotor core 42 includes multiple salient poles at the outer circumferential periphery. The salient poles are protruded from the rotor core 42 toward the stator 30 and are arranged at a predetermined angular interval such as 45 degrees.

As follows, the configuration of the reduction gear will be described. The reduction gear is, for example, a planetary gear device such as a cycloid reduction gear device. The reduction gear includes a sun gear 50, an output shaft 60, and a ring gear 70. The sun gear 50 includes a tubular center portion 51 and a disc portion 52. The disc portion 52 extends radially outward from the center portion 51. A middle bearing 53 is equipped to the inner circumferential periphery of the center portion 51. The middle bearing 53 includes two bearing devices arranged in the axial direction. The middle bearing 53 supports the eccentric portion 45 of the rotor axis 41. The disc portion 52 includes outer teeth 54 at the outer circumferential periphery and includes multiple projected portions 55 at the surface on the side of the output shaft 60. The projected portions 55 are projected toward the output shaft 60 and are arranged in the circumferential direction of the disc portion 52 at a predetermined interval.

The output shaft 60 includes a support portion 61, a cup portion 62, and a flange portion 63. The support portion 61 supports the tip end 46 of the rotor axis 41. The cup portion 62 extends from the support portion 61. The cup portion 62 is in a cup shape opened on the side of the sun gear 50. The flange portion 63 extends radially outward from the opening brim of the cup portion 62.

The support portion 61 is equipped with a front bearing 64. The front bearing 64 supports the tip end 46 of the rotor axis 41. The flange portion 63 has fitting holes 65 extending in the axial direction. In the present example structure, the projected portions 55 of the sun gear 50 are loosely fitted respectively in the fitting holes 65.

The ring gear 70 includes an annular base portion 71. The annular base portion 71 is larger than the sun gear 50. As shown in FIG. 2, the annular base portion 71 has a brim portion on the side of the front housing 20. The brim portion is bent inward to define the opening 72. Inner teeth 73 protrude radially inward from the opening 72. Ear portions 74 are located on the outer circumferential periphery of the annular base portion 71 and are arranged at a predetermined angular interval. The ear portions 74 protrude from the annular base portion 71.

The ring gear 70 is press-fitted to the front housing 20 via the ear portion 74. The sun gear 50 is supported by the eccentric portion 45 of the rotor axis 41. The inner teeth 73 of the ring gear 70 mesh with the outer teeth 54 of the sun gear 50.

In the present example configuration, the sun gear 50 is in contact with the inner periphery of the ring gear 70. When the rotor axis 41 rotates, the sun gear 50 rotates centering on the eccentric portion 45 while performing an orbital motion inside the ring gear 70. The projected portion 55 of the disc portion 52 is in contact with the wall defining the fitting hole 65 of the output shaft 60 in the rotative direction. Thereby, the rotation of the sun gear 50 is transmitted to the output shaft 60.

Figure 3:
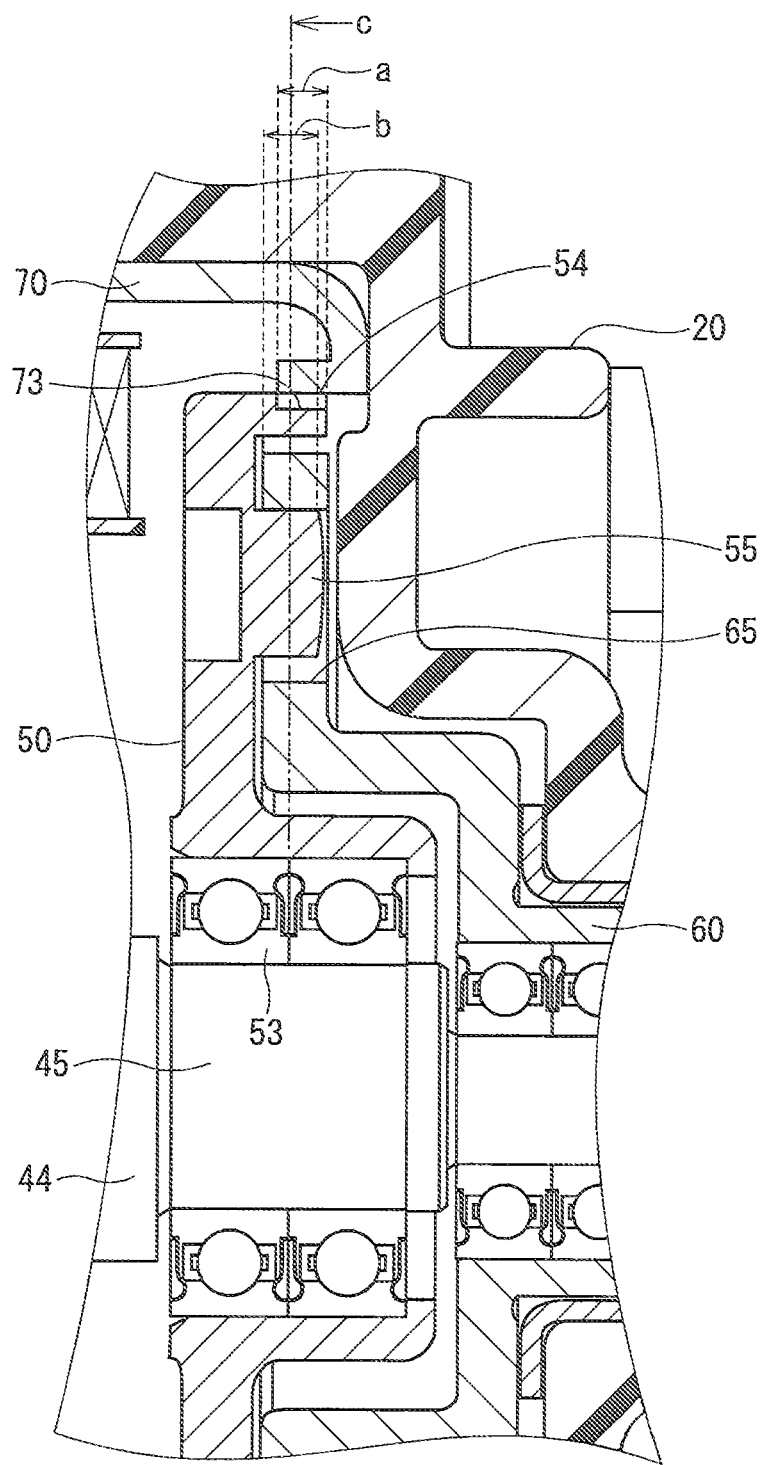
FIG. 3 is a sectional view showing components of the rotary actuator according to the one embodiment.

As shown in FIG. 3, the middle bearing 53 supporting the sun gear 50 has a center position c in the axial direction. The outer teeth 54 of the sun gear 50 and the inner teeth 73 of the ring gear 70 have an overlap region (gear overlap region) a therebetween in the axial direction. The projected portion 55 of the sun gear 50 and the fitting hole 65 of the output shaft 60 have an overlap region (fitting overlap region) b therebetween in the axial direction. In the present embodiment, the center position c of the middle bearing 53 is located, i.e., included in both the overlap regions a, b in the axial direction.

In the present configuration, the deviation between the center position of the middle bearing 53 and a contact position, at which the sun gear 50 is in contact with the output shaft 60, can be set small in the axial direction. In addition, the deviation between the center position of the middle bearing 53 and a mesh position, at which the sun gear 50 is meshed with the ring gear 70, can be also set small in the axial direction. Consequently, moment of force acting to the sun gear 50 in a direction different from the rotative direction can be reduced. Thus, inclination of the sun gear 50 can be reduced, and thereby, the gear efficiency of the rotary actuator can be enhanced.

The present invention is not limited to the above-described embodiment and is practicable in various different forms.

Figure 4:
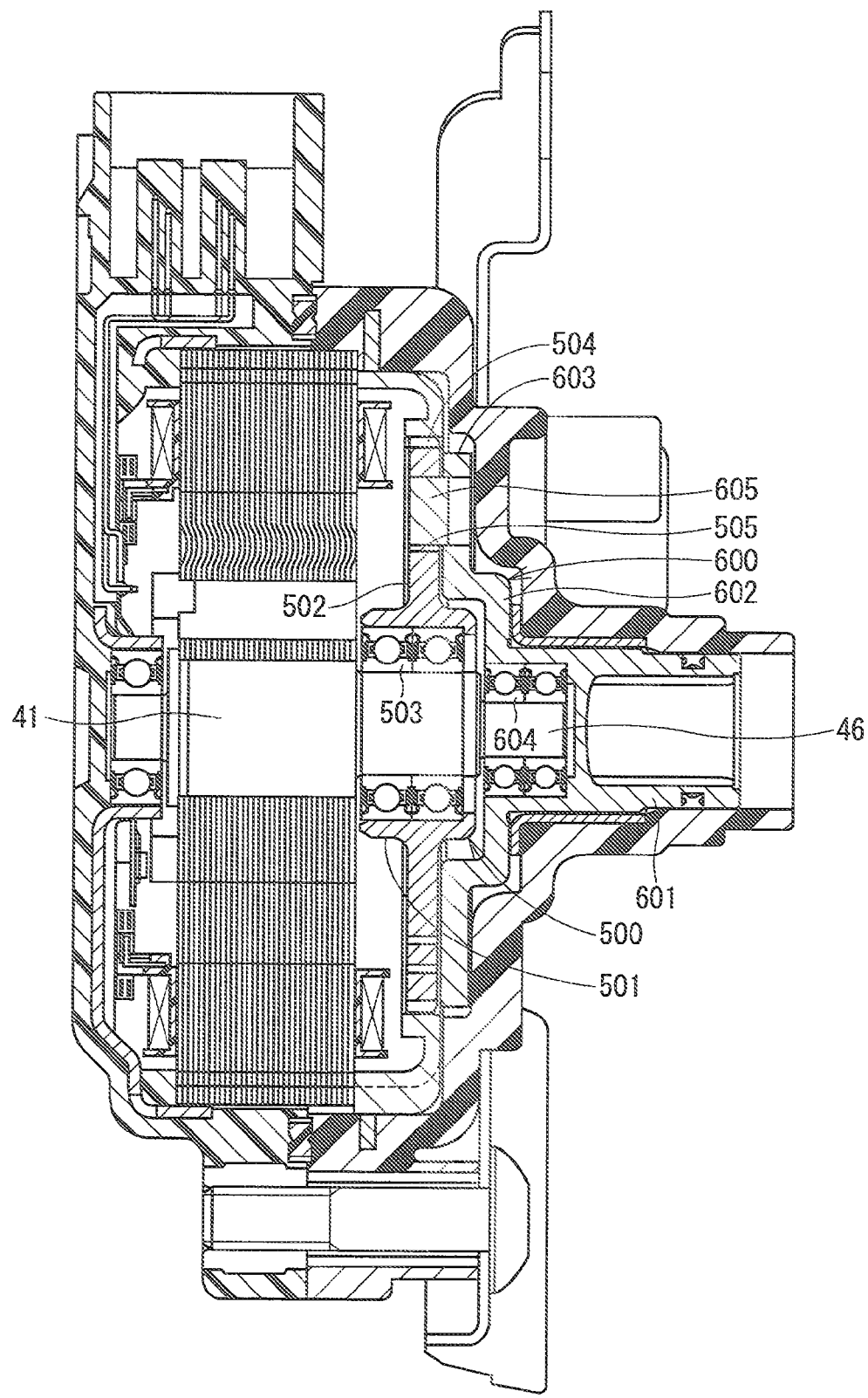
FIG. 4 is a sectional view showing a rotary actuator according to another embodiment.

(i) For example, a sun gear 500 and an output shaft 600 shown in FIG. 4 may be employed. In the present configuration, the sun gear 500 includes a tubular center portion 501 and a disc portion 502. The disc portion 502 extends radially outward from the center portion 501. A middle bearing 503 is equipped to the inner circumferential periphery of the center portion 501. The disc portion 502 includes outer teeth 504 at the outer circumferential periphery. The sun gear 500 has fitting holes 505 at the disc portion 502. The fitting holes 505 are through holes extending in the axial direction.

The output shaft 600 includes a support portion 601, a cup portion 602, and a flange portion 603. The support portion 601 supports a tip end 46 of a rotor axis 41. The cup portion 602 extends from the support portion 601. The cup portion 602 is in a cup shape opened on the side of the sun gear 500. The flange portion 603 extends radially outward from the opening brim of the cup portion 602. The flange portion 603 includes projected portions 605 projected toward the sun gear 500 and loosely fitted to the fitting holes 505 of the sun gear 500.

In the above-described embodiment, the projected portions 55 are formed on the sun gear 50, and the fitting holes 65 are formed in the output shaft 60. Contrary to the above-described embodiment, the fitting holes 505 are formed in the sun gear 500, and the projected portions 605 are formed on the output shaft 600 in the present example. The present configuration produces an operation effect similar to that of the above-described embodiment.

(ii) In the above embodiment, as described with reference to FIG. 3, the middle bearing 53 supporting the sun gear 50 has the center position c in the axial direction. The outer teeth 54 of the sun gear 50 and the inner teeth 73 of the ring gear 70 have the overlap region a therebetween in the axial direction. The projected portions 55 of the sun gear 50 and the fitting holes 65 of the output shaft 60 have the overlap region b therebetween in the axial direction. The center position c of the middle bearing 53 is included in both the overlap regions a, b in the axial direction.

Contrary to the above-described embodiment, the center position c of the middle bearing 53 supporting the sun gear 50 may be included only in the overlap region b between the projected portion 55 of the sun gear 50 and the fitting hole 65 of the output shaft 60 in the axial direction.

The number of the fitting portion may be one or may be two or more. The number of the fitted portion may be one or may be two or more.

Summarizing the above embodiments, a rotary actuator includes a tubular stator and a rotor. The rotor is rotatably supported on the radially inside of the stator. The rotor includes a rotor axis. The rotor axis includes an eccentric portion having an axis, which is eccentric relative to the center axis.

The rotary actuator further includes a disc-shaped sun gear, an annular ring gear, and an output shaft. The output shaft is configured to transmit rotation of the sun gear. The sun gear is rotatably supported by the eccentric portion via the bearing. The sun gear is formed with outer teeth at the outer circumferential periphery. The sun gear is formed with a fitting portion for transmitting rotation in the axial direction.

The ring gear is located on the radially outside of the sun gear. The ring gear is formed with inner teeth at the inner circumferential periphery. The inner teeth are meshed with the outer teeth of the sun gear.

The output shaft is located in the axial direction of the sun gear. The output shaft is formed with a fitted portion loosely fitted with the fitting portion of the sun gear. Contact between the fitting portion and the fitted portion in the rotative direction enables the output shaft to transmit rotation of the sun gear.

The center position of the bearing of the sun gear is included in an overlap region between the fitting portion of the sun gear and the fitted portion of the output shaft in the axial direction. For example, as shown in FIG. 3, the center position c located at the center of the middle bearing 53 in the axial direction is within the overlap region b between the projected portion 55 of the sun gear 50 and the fitting hole 65 of the output shaft 60 in the axial direction. In this case, the projected portion 55 may be an example of the fitting portion, and the fitting hole 65 may be an example of the fitted portion.

In the present configuration, the deviation between the center position of the bearing of the sun gear and the contact position of the sun gear with the output shaft is reduced in the axial direction. Therefore, moment of force working on the sun gear in a direction different from the rotative direction can be effectively reduced. Consequently, inclination of the sun gear can be reduced, and the gear efficiency can be enhanced.

The center position of the bearing of the sun gear may be included in an overlap region between the outer teeth of the sun gear and the inner teeth of the ring gear. For example, as shown in FIG. 3, the center position c located at the center of the middle bearing 53 in the axial direction is within the overlap region a between the outer teeth 54 of the sun gear 50 and the inner teeth 73 of the ring gear 70 in the axial direction.

In the present configuration, the deviation between the center position of the bearing and the contact position of the sun gear with the output shaft is reduced in the axial direction. In addition, the deviation between the center position of the bearing and the mesh position of the sun gear with the ring gear in the axial direction can be also reduced. Consequently, moment of force acting on the sun gear in a direction different from the rotative direction can be reduced. Thus, inclination of the sun gear can be reduced, and thereby, the gear efficiency can be enhanced.

The fitting portion of the sun gear may be a projected portion protruded toward the output shaft. In this case, the fitted portion of the output shaft may be a hole portion to which the projected portion is loosely fitted.

Contrary, the fitted portion of the output shaft may be a projected portion protruded toward the sun gear. In this case, the fitting portion of the sun gear may be a hole portion to which the projected portion is loosely fitted.

Various modifications and alternations may be diversely made to the above embodiments without departing from the spirit of the present invention.

What is claimed is:

1. A rotary actuator comprising:
    a tubular stator;
    a rotor located radially inside of the stator, the rotor including a rotor axis having an eccentric portion, the eccentric portion having an eccentric axis eccentric relative to a center axis of the rotor;
    a disc-shaped sun gear supported by the eccentric portion via a bearing and eccentrically rotatable relative to the center axis, the sun gear including outer teeth at an outer circumferential periphery, the sun gear further including a fitting portion for transmitting rotation in an axial direction;
    an annular ring gear located radially outside of the sun gear, the ring gear including inner teeth at an inner circumferential periphery, the inner teeth of the ring gear being meshed with the outer teeth of the sun gear; and
    an output shaft adjacent to the sun gear in the axial direction, the output shaft including a fitted portion loosely fitted to the fitting portion of the sun gear to be in contact with the fitting portion in a rotative direction to transfer rotation of the sun gear to the output shaft, wherein:
    the bearing of the sun gear has a center position in the axial direction,
    the center position of the bearing is located in a fitting overlap region between the fitting portion of the sun gear and the fitted portion of the output shaft in the axial direction,
    the center position of the bearing is located in a gear overlap region between the outer teeth of the sun gear and the inner teeth of the ring gear in the axial direction,
    the fitting portion of the sun gear is a projected portion projected toward the output shaft, and
    the bearing of the sun gear includes two bearing devices arranged in the axial direction.

2. The rotary actuator according to claim 1, wherein the fitted portion of the output shaft is a hole portion in which the projected portion is loosely fitted.

3. The rotary actuator according to claim 1, wherein an interface between the bearing devices defines the center position of the bearing.

4. The rotary actuator according to claim 1, wherein the sun gear is configured to move in an orbital path inside the ring gear when the rotor axis rotates.

5. The rotary actuator according to claim 1, wherein the tubular stator includes a stator core and a coil.

* * * * *